United States Patent [19]

Whiteaker

[11] Patent Number: 4,883,166
[45] Date of Patent: Nov. 28, 1989

[54] CONVEYING SYSTEM

[75] Inventor: Charles F. Whiteaker, Bristol, Va.

[73] Assignee: Reynolds Metals Company, Richmond, Va.

[21] Appl. No.: 774,013

[22] Filed: Sep. 9, 1985

[51] Int. Cl.[4] ............................................. B65G 15/42
[52] U.S. Cl. .................................. 198/688.1; 198/836
[58] Field of Search ................ 198/836, 688.1, 803.14, 198/426, 462; 414/109

[56] References Cited

U.S. PATENT DOCUMENTS

| 137,224 | 3/1873 | Mansfield | 198/690.2 |
|---|---|---|---|
| 2,117,517 | 5/1938 | Smith et al. | 198/462 |
| 2,198,594 | 4/1940 | Mundy | 198/836 |
| 2,670,838 | 3/1954 | Carter | 198/836 |
| 3,092,237 | 6/1963 | Miller | 198/836 |
| 3,179,237 | 4/1965 | Ninneman | 198/836 |
| 3,292,772 | 12/1966 | Rice | 198/836 |
| 3,395,784 | 8/1968 | Kanarek | 198/425 |
| 3,508,642 | 4/1970 | Standley et al. | 198/836 |
| 3,677,391 | 7/1972 | Schaffer | 198/462 |
| 3,710,926 | 1/1973 | Santen | 198/803.14 |
| 3,739,904 | 6/1973 | Windstrup | 198/836 |
| 3,768,624 | 10/1973 | Kornylak | 198/836 |
| 3,788,457 | 1/1974 | Valentino, Jr. | 198/836 |
| 3,848,732 | 11/1974 | Catalano | 198/836 |
| 3,850,284 | 11/1974 | Roberts | 198/836 |
| 3,874,497 | 4/1975 | Carlson | 198/836 |
| 3,908,332 | 9/1975 | Ebbinghaus et al. | 198/425 X |
| 3,978,971 | 9/1976 | Conrow et al. | 198/425 X |
| 4,082,176 | 4/1978 | Pommer | 198/425 X |
| 4,479,574 | 10/1984 | Julius et al. | 198/841 X |

Primary Examiner—Robert J. Spar
Assistant Examiner—D. Glenn Dayoan
Attorney, Agent, or Firm—Alan T. McDonald

[57] ABSTRACT

A conveying system for relatively thin objects is disclosed. The system employs a grooved moving belt positioned at the bottom of a channel formed from replaceable side rails, with the side rails being shaped to conform generally to the upstanding object.

7 Claims, 4 Drawing Sheets

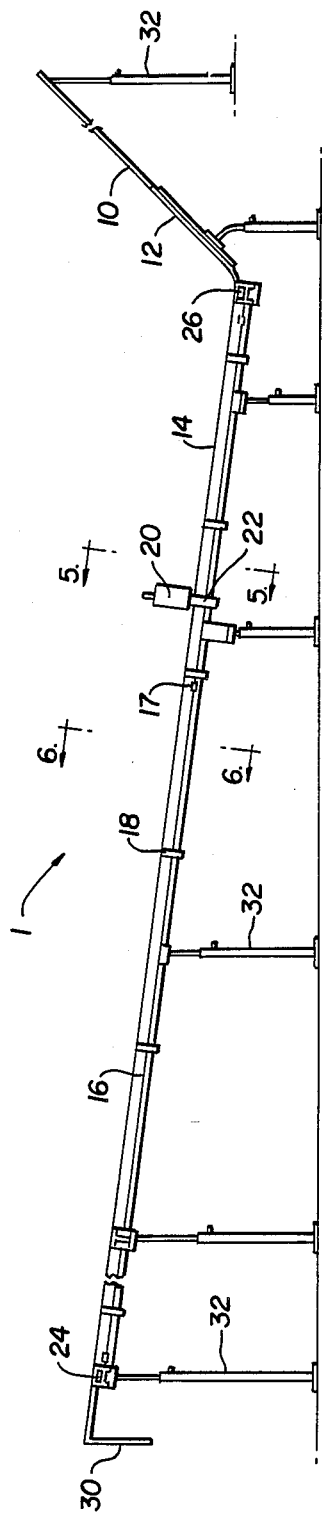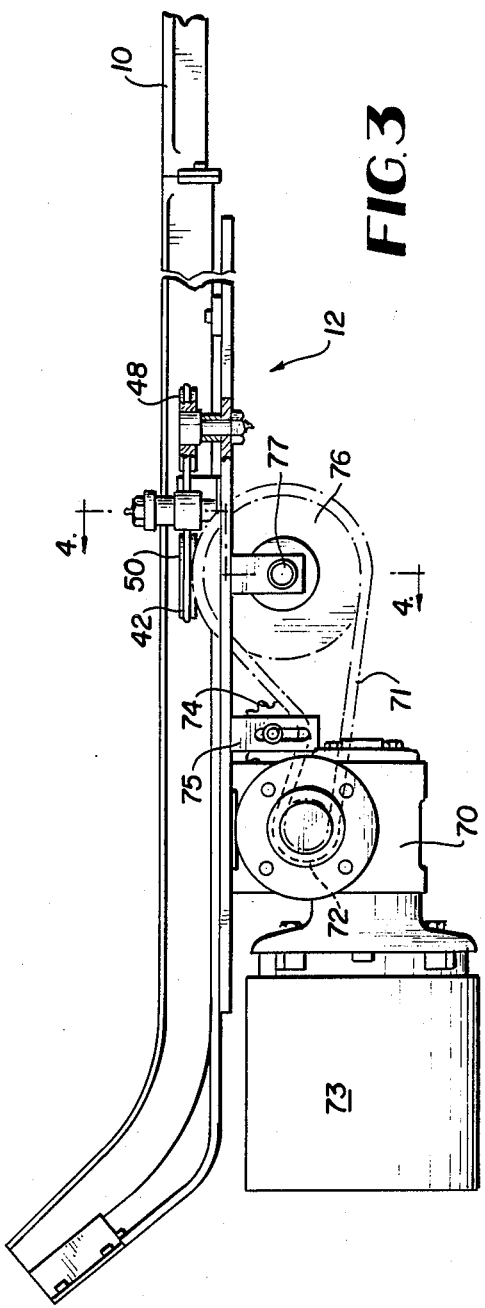

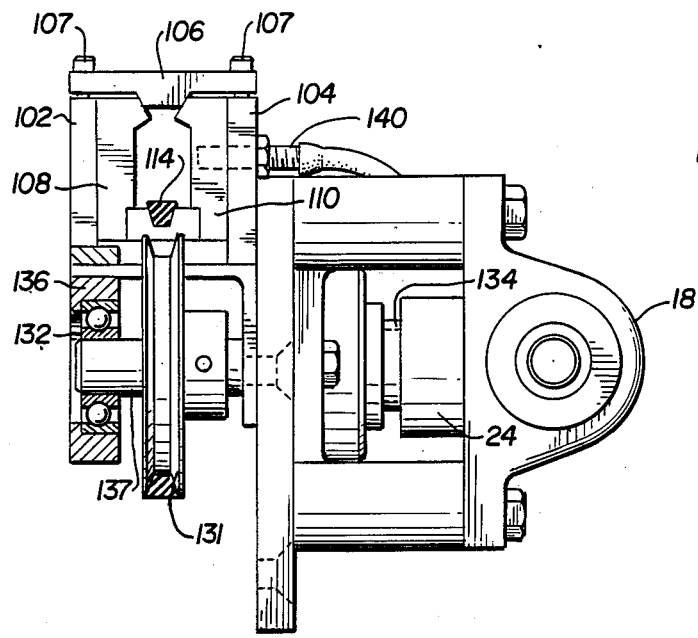
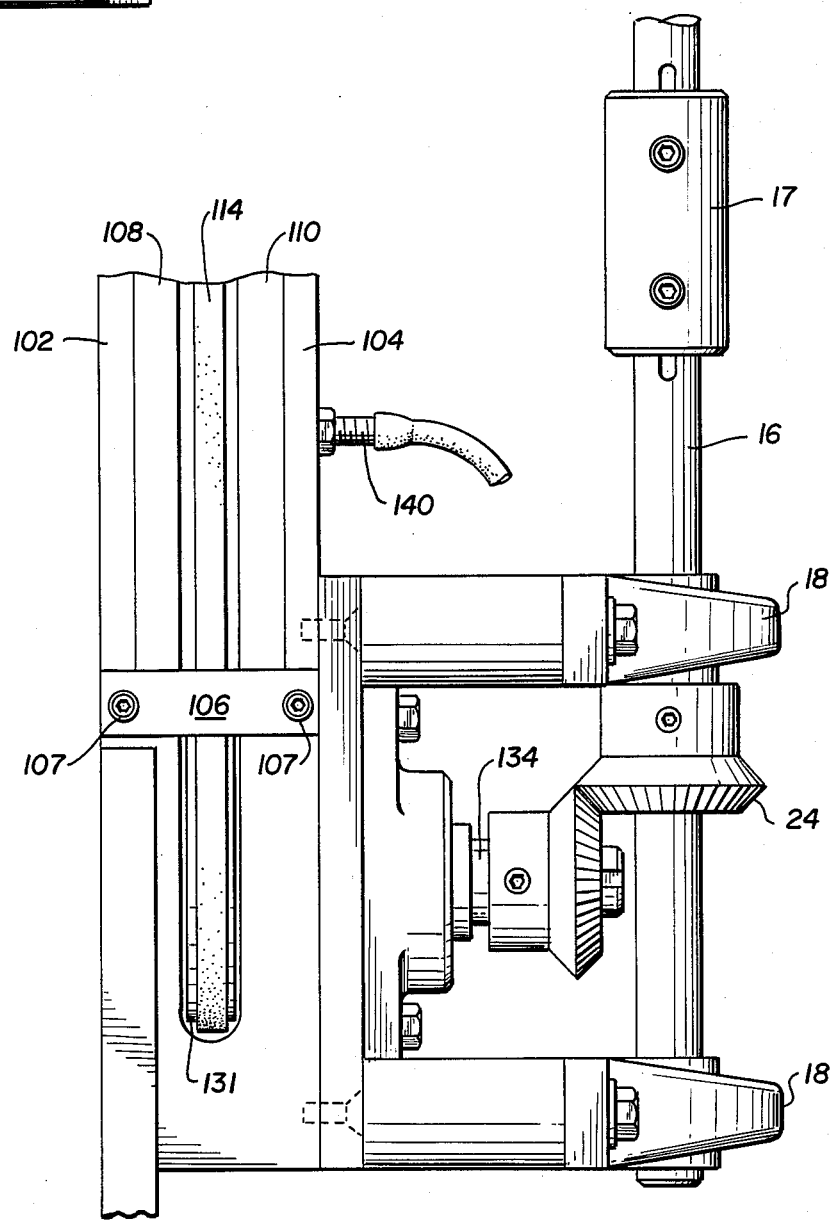
FIG.10
FIG.11

CONVEYING SYSTEM

BACKGROUND OF THE INVENTION

There are numerous stick-like objects for which conveying is a problem. Examples of such products include ice cream bar sticks, easy-open can end tabs, and the like. Common characteristics of these products include a thickness which is substantially less than the length or width of the product and an inability of individual objects to stand upright without support.

Due to the lack of mechanized conveying systems for such objects, excessive manual handling of these objects is necessitated in manufacturing operations where such objects are produced or required.

For example, in the case of easy-open can end tabs, it is common for the tabs to be produced at one press within a facility, gathered as "sticks" on metal rods and manually transported to another location in the plant where the "sticks" are manually fed to another press for fixing the tabs on can ends.

There is a need, therefore, for a mechanized conveying system capable of transporting such stick-like objects reliably, while reducing the manpower necessary for conveying these materials.

THE PRESENT INVENTION

By means of the present invention, this desired goal has been obtained.

The present invention comprises a conveying system which is capable of conveying generally thin, stick-like objects in their upright position. The conveyor system of the present invention comprises an endless belt having a series of grooves crosswise to the direction of travel of the belt and forming the bottom of a channel within which the objects are conveyed. The conveying system channel also includes a pair of sidewall members which are shaped to conform generally to the objects being conveyed in their upright mode. In a preferred embodiment, these sidewalls are designed as replaceable members, enabling the conveying system to be easily and rapidly converted to variously shaped objects.

A mechanized feeder, which may form a portion of the entrance to the conveying system, includes a channel conforming generally to the shape of the objects in their upright position with the channel having an opening on either side of the channel. A pair of endless belts contact the objects at the openings of the channel, providing driving force for the objects within this entrance portion of the conveying system.

BRIEF DESCRIPTION OF THE DRAWINGS

The conveying system of the present invention will be more fully described with reference to the Figures in which:

FIG. 1 is a side elevational view of the conveying system of the present invention;

FIG. 3 is a side elevational view of the driving mechanism of FIG. 2;

FIG. 10 is an end view of the end portion of the conveyor system; and

FIGURE 11 is a top elevational view of the end portion of the conveyor system.

DETAILED DESCRIPTION OF THE PREFERRED EMBODIMENTS

Figure 2:
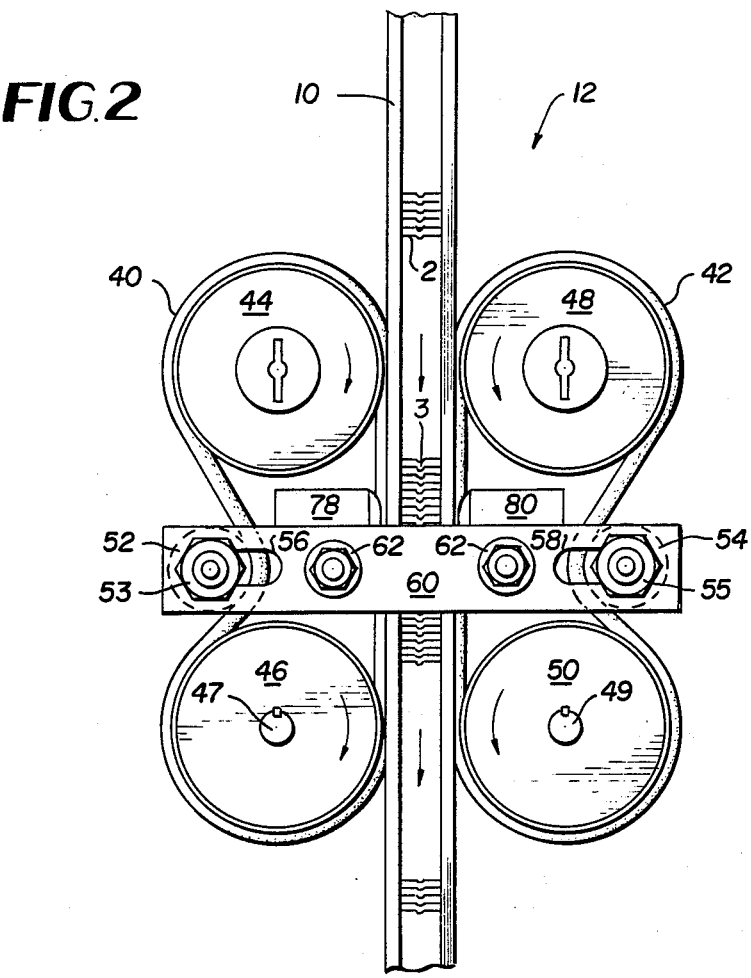
FIG. 2 is a top elevational view of the driving mechanism within the entrance portion of the conveying system.

Turning now to the Figures, the conveying system of the present invention is shown as a diagramatic side view in FIG. 1. The conveying system 1 includes an in-feed channel 10, an in-feed driving mechanism 12, a main channel 14 and an exit channel 30. Main channel 14 will be more fully described below, as will channel 10 and in-feed driving mechanism 12. Driving force for channel 14 is provided by drive shaft 16, which drive shaft 16 is connected to 90° gear boxes or bevel gears 24 and 26 at the ends thereof and which is held in position by a series of bearings 18 along the length of channel 14. Drive shaft 16 may also include one or more connectors 17 along the length thereof, depending upon the length of channel 14. Driving rotational force for drive shaft 16 is provided by motor 20 and gear box 22. The entire conveying system 1 rests upon a series of floor mounted stands 32.

Figure 4:
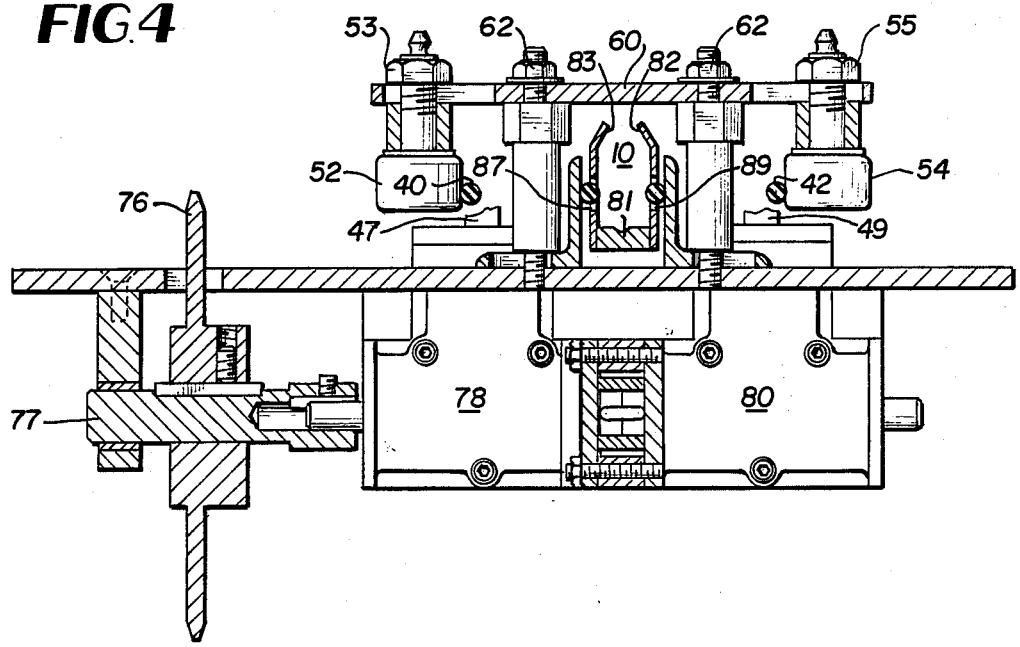
FIG. 4 is a cross-sectional view of the driving mechanism taken along line 4—4 of FIG. 3.

The in-feed driving mechanism for the conveyor system is illustrated in FIGS. 2, 3 and 4. Objects 2 enter the system along track or channel 10 in an upright position. Track or channel 10 may be connected directly to a source of the objects 2, such as a press forming the objects 2, or may be an open channel which is manually fed with objects 2. As the objects 2 pass along channel 10 as a continuous stick 3, they are engaged between a pair of belts 40 and 42 along their sides at openings 87 and 89 within sidewalls 83 and 82 of track 10. Track 10 also includes a bottom wall 81.

Driving force for the belts 40 and 42 is provided by a motor means 73 and gear box 70. Connected to gear box 70 is drive sprocket 72 around which passes chain or belt 71. A tension controlling sprocket 74 is adjustably mounted on bracket 75. Belt or chain 71 in turn rotates sprocket 76 which, by means of shaft 77, is connected to gear boxes 78 and 80, which gear boxes 78 and 80 are linked to one another. Gear boxes 78 and 80 rotate shafts 47 and 49 to which are attached wheels or pulleys 46 and 50, respectively. Belt 40, which passes around pulley 46 also passes around idler wheel or pulley 44 and an adjustable tension controlling idler pulley 52, with its adjustment being provided by bolt 53 and an opening 56 upon mounting bracket 60. Similarly, belt 42 passes around drive wheel or pulley 50 and idler wheel or pulley 48, with tension control wheel or pulley 54 being adjustably mounted by bolt 55 and opening 58 in bracket 60. Bracket 60 is held in place by bolts 62.

Thus, a constant speed force is applied to the objects 2 as they reach the openings 87 and 89 in channel 10, with this force aiding forward movement of the objects to channel 14.

Channel 10 is shaped to conform generally to the shape of the objects 2 in their upright position. Channel 10 need not conform completely to the shape of the objects 2, but must provide sufficient lateral support to the objects 2 to permit them to pass along channel 10 in their upright position as a stick without significant side-to-side movement.

Figure 5:
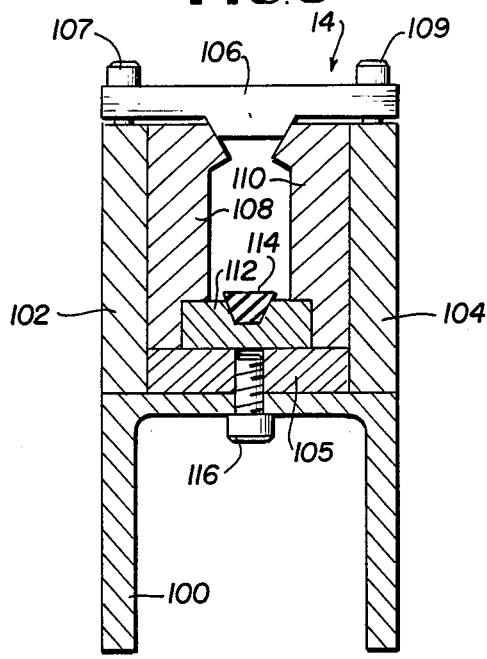
FIG. 5 is a cross-sectional view of the conveyor channel taken along line 5—5 of FIG. 1.
Figure 6:
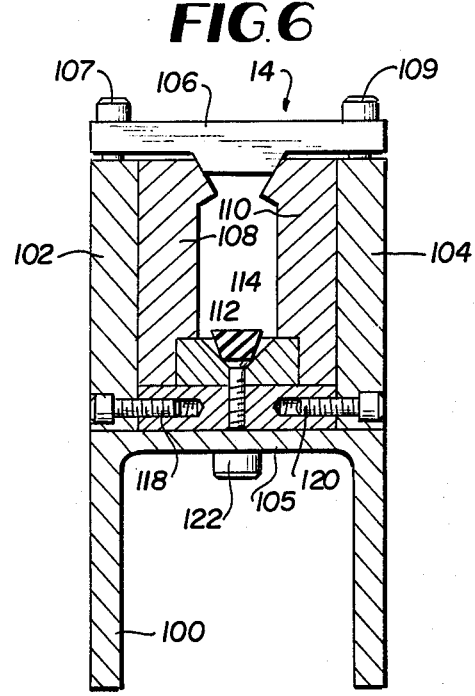
FIG. 6 is a cross-sectional view of the conveyor channel taken along line 6—6 of FIG. 1.

FIGS. 5 and 6 illustrate the main body of the conveyor system channel 14 taken at two different points along the conveyor channel 14.

Channel 14 comprises a base 100 to which are mounted base bottom wall 105 by means of screws 116 and base sidewalls 102 and 104 which are mounted to base bottom wall 105 by means of screws 118 and 120. A belt receiving bottom wall 112 is fixed in position by means of screw 122. This forms a stable base for the channel 14.

Mounted within the channel formed by walls 102, 104, 105 and 112 are a pair of removable sidewalls 108 and 110. Sidewalls 108 and 110 are held in position by means of a series of hold down plates 106 running along the length of channel 14, with the hold down plates 106 being mounted onto side walls 102 and 104 by means of screws 107 and 109.

The inner sidewalls 108 and 110 are designed to conform generally to the shape of the object being transported by the channel 14. Preferably, sidewalls 108 and 110 are formed from a plastics resin or rubber material which is easily molded to the shape of a given object to be carried by conveyor system 1 and, by removing screws 107 and 109 and hold down plates 106, sidewalls 108 and 110 may be easily replaced with similar sidewalls 108 and 110 conforming to the configuation of difference objects 2 to be conveyed by the conveying system 1. Of course, if conversion capability is not required by a given system, sidewalls 102 and 108 and sidewalls 104 and 110 could be formed as single pieces.

Running within inner bottom wall 112 is an endless belt 114. The driving means for endless belt 114 will be described more fully below.

Figure 7:
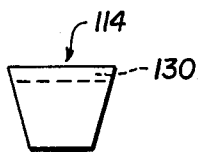
FIG. 7 is an end view of the endless belt employed in the conveying system.
Figure 8:
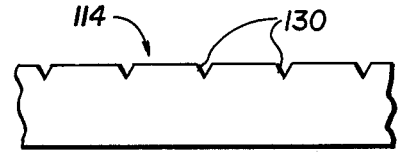
FIG. 8 is a side elevational view of the belt shown in FIG. 7.

The configuration of belt 114 is shown in FIGS. 7 and 8. Belt 114 is basically a standard V-belt, which may be formed of rubber, a plastics resin, or other similar relatively high coefficient of friction material. Belt 114 has, however, a series of transverse grooves 130 which are formed into the surface of belt 114 in contact with the bottoms of certain of the objects 2 and driving the objects 2 along conveyor system 1. It has been found that without grooves 130, slippage of the objects 2 and thus gaps in the continuous flow of objects 2 along the conveyor occur. This in turn leads to objects 2 falling from their upright position and an inability of the conveyor system to perform its task. Grooves 130, however, provide additional force to certain of the objects 2, enabling the conveying system 1 to successfully convey continuous sticks of objects 2 without gaps and without objects 2 falling from their upright position.

Figure 9:
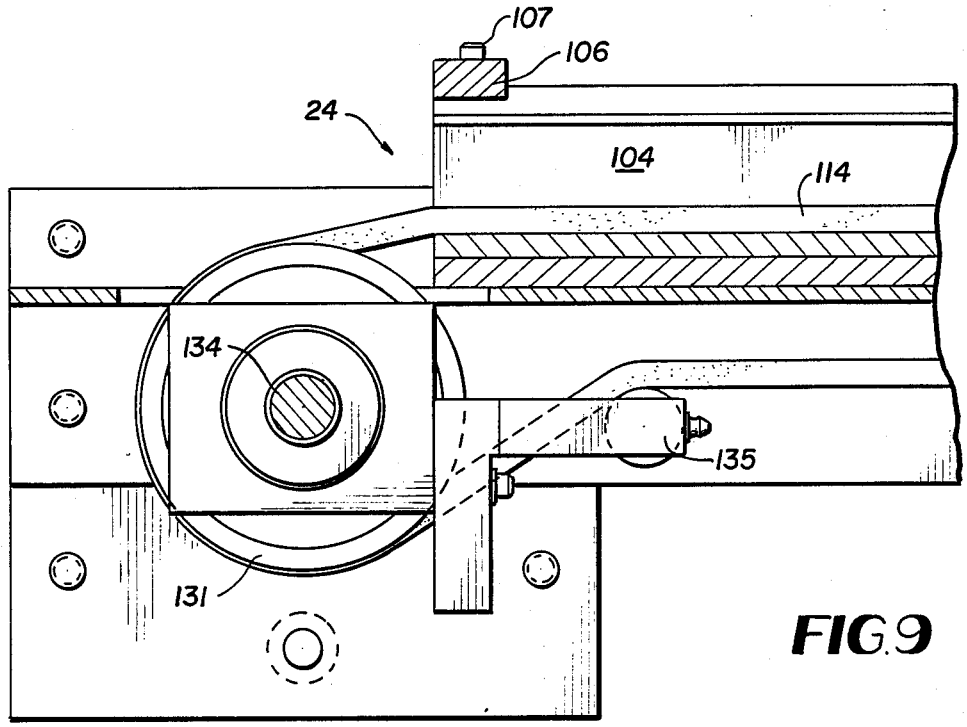
FIG. 9 is a side elevational view of an end portion of the conveyor system.

FIGS. 9–11 illustrate the driving mechanism for belt 114. In these Figures, the upper end of the conveying system 1 is illustrated. An identical configuration is located at the lower end of the conveying system 1.

Belt 114 passes around pulley 131 and is guided in its return under channel 14 by pulley 135.

Pulley 131 is mounted over shaft 137, which shaft 137 is mounted within bearing 132 and mounting bracket 136. Shaft 137 is in turn mounted to a shaft 134 of gear box or bevel gears 24. Gear box 24 takes the rotational power of drive shaft 16, which, as previously mentioned, is connected to motor 20 through gear box 22 and which may contain connectors 117 along the length thereof, and transfers this rotational power to shaft 134, and, in turn, to pulley 131.

As gear boxes 24 and 26 are both connected to the same drive shaft 16, constant force is applied to belt 114 at both ends thereof.

Also illustrated in FIG. 11 is one of the hold down plates 106 which removably hold inner sidewall members 108 and 110 in place.

Also shown in FIGS. 10 and 11 is an optical sensor 140 which may be positioned near the end of channel 14, as a diagnostic tool to confirm that a constant stick of objects 2 is present. Should sensor 140 fail to see objects 2, sensor 140 may be attached to an alarm or may be configured to shut down conveyor system 1.

From the foregoing, it is clear that the present invention provides for an effective means for conveying relatively thin objects in their upright position.

While the invention has been disclosed with reference to certain specific embodiments thereof, it is not intended to be so limited thereby, except as set forth in the accompanying claims.

I claim:

1. A conveyor system for transporting relatively thin articles in their upright position as a continuous stick without gaps between adjacent articles comprising a channel, said channel having a pair of stationary sidewalls and a bottom wall, said sidewalls conforming generally to the shape of said articles in their upright position and providing lateral support to said articles to thereby prevent significant side-to-side movement of said articles, said bottom wall including an endless belt therein, and means for driving said endless belt and providing driving force to said articles, said endless belt having spaced transverse grooves therein to provide additional driving force to certain of said articles in said continuous stick to thereby prevent slippage of said articles and gaps in said continuous stick.

2. The conveyor system of claim 1 wherein said means for driving comprises a drive shaft, gear means connected at each end of said drive shaft and to pulleys around which said belt passes and motor means for driving said drive shaft.

3. The conveyor system of claim 1 wherein said sidewalls are removable and wherein said channel includes hold down plates for maintaining said sidewalls in position during use of said conveyor system.

4. The conveyor system of claim 3 wherein said sidewalls are formed from a plastics resin or rubber.

5. The conveyor system of claim 1 further comprising an entrance conveyor attached to said channel and means for driving said articles in their upright position along said entrance conveyor and into said channel as a continuous stick.

6. The conveyor system of claim 5 wherein said means for driving said articles along said entrance conveyor comprises endless belts positioned on each side of said entrance conveyor and contacting the sides of said articles through openings in said entrance conveyor and means for driving said endless belts positioned on each side of said entrance conveyor.

7. The conveyor system of claim 6 wherein said means for driving said endless belts positioned on each side of said entrance conveyor comprises a motor means, a first gear box connected to said motor means, pulleys around which said endless belts pass and a second gear box connecting said first gear box to one of said pulleys for each of said endless belts.

* * * * *